(12) United States Patent
Sun et al.

(10) Patent No.: US 11,592,562 B2
(45) Date of Patent: Feb. 28, 2023

(54) CONTINUOUS-WAVE LIGHT DETECTION AND RANGING (LIDAR) SYSTEM

(71) Applicant: LightIC Technologies HK Limited, Santa Clara, CA (US)

(72) Inventors: Tianbo Sun, Sunnyvale, CA (US); Jie Sun, San Jose, CA (US)

(73) Assignee: LIGHTIC TECHNOLOGIES HK LIMITED, Santa Clara, CA (US)

( * ) Notice: Subject to any disclaimer, the term of this patent is extended or adjusted under 35 U.S.C. 154(b) by 358 days.

(21) Appl. No.: 16/907,837

(22) Filed: Jun. 22, 2020

(65) Prior Publication Data

US 2021/0396879 A1 Dec. 23, 2021

(51) Int. Cl.
*G01S 17/32* (2020.01)
*G01S 7/481* (2006.01)
*G01S 7/499* (2006.01)

(52) U.S. Cl.
CPC ............. *G01S 17/32* (2013.01); *G01S 7/4811* (2013.01); *G01S 7/4815* (2013.01); *G01S 7/4817* (2013.01); *G01S 7/499* (2013.01)

(58) Field of Classification Search
CPC ...... G01S 17/32; G01S 7/4817; G01S 7/4811; G01S 7/4815; G01S 7/499; G01S 7/4917; G01S 7/4812; G01S 17/34; G01S 17/36; G01S 7/4861
USPC ...................................................... 356/5.14
See application file for complete search history.

(56) References Cited

U.S. PATENT DOCUMENTS

| 5,164,784 | A | 11/1992 | Waggoner |
| 11,181,641 | B2 * | 11/2021 | Crouch ................. G01S 7/4817 |
| 2016/0266322 | A1 | 9/2016 | Epitaux et al. |
| 2018/0275257 | A1 | 9/2018 | Kim |
| 2020/0088878 | A1 | 3/2020 | Talty et al. |

FOREIGN PATENT DOCUMENTS

WO 2018183539 A1 10/2018

OTHER PUBLICATIONS

PCT/US20/49067—International Search Report and Written Opinion, dated Sep. 2, 2020, 16 pages.

* cited by examiner

*Primary Examiner* — Daniel L Murphy
(74) *Attorney, Agent, or Firm* — Getech Law LLC; Jun Ye

(57) ABSTRACT

Aspects for an on-chip or integrated continuous-wave Light Detection and Ranging (LiDAR) are described herein. The aspects may include one or more laser light sources configured to generate one or more light beams and multiple light engines configured to respectively receive the light beams. The light frequency is modulated in a predefined pattern. A light transmitter of each light engine may be configured to receive a first portion of one of the light beams and transmit the first portion of the light beam at a predetermined angle. A light receiver of each light engine may be configured to receive the first portion of the light beam reflected from an object and transmit the reflected first portion of the light beam to a balanced detector. The balanced detector may be configured to detect a beat between the reflected first portion of the light beam with a second portion of the light beam.

10 Claims, 15 Drawing Sheets

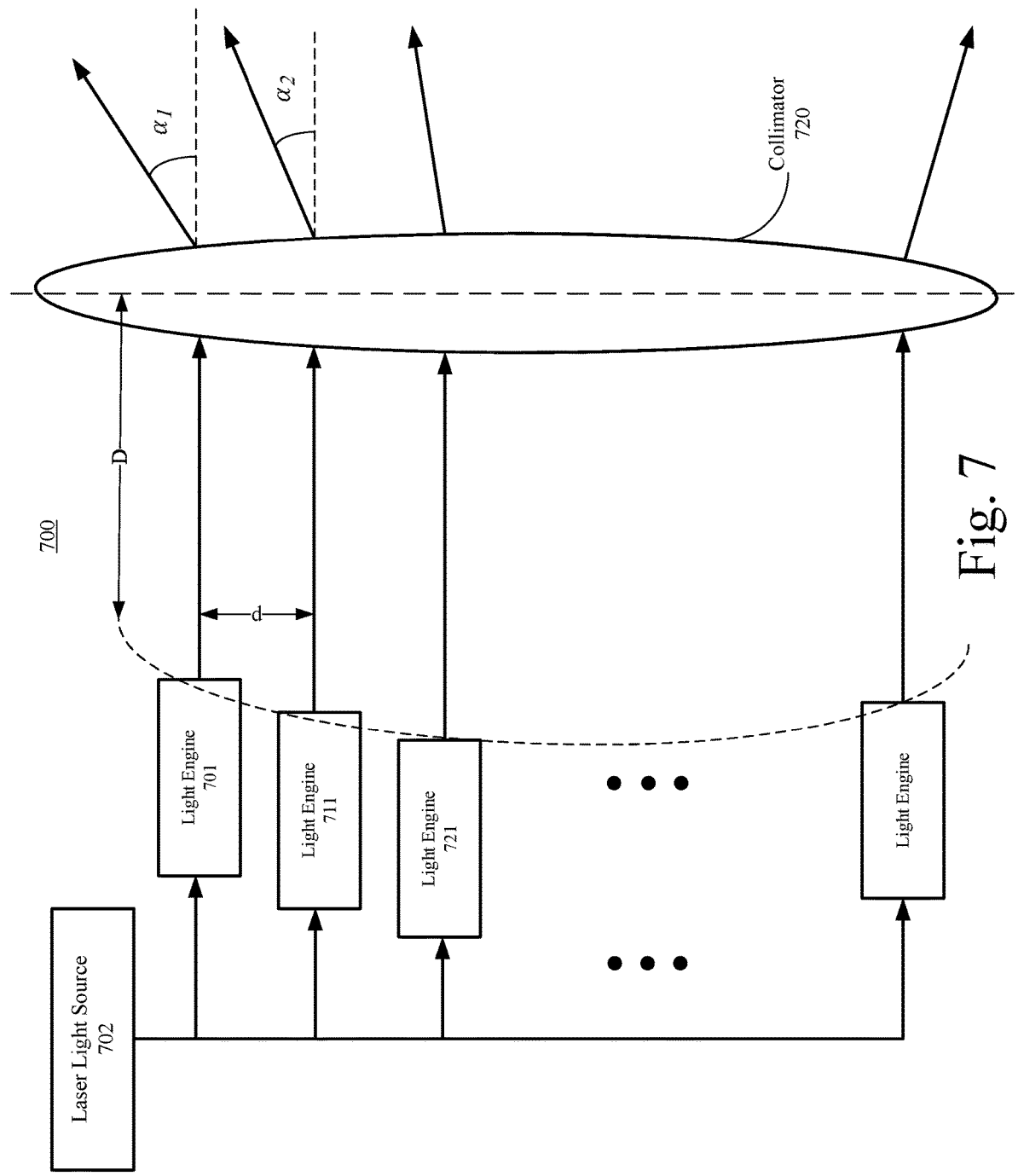

CONTINUOUS-WAVE LIGHT DETECTION AND RANGING (LIDAR) SYSTEM

BACKGROUND

Unless otherwise indicated herein, the materials described in this section are not prior art to the claims in this application and are not admitted to be prior art by inclusion in this section.

LiDAR devices are now widely deployed in different scenarios including autonomous vehicles. A LiDAR may actively estimate distances to environmental features while scanning through a scene to generate a cloud of point positions indicative of the three-dimensional shape of the environmental scene. Individual points are measured by generating a laser pulse and detecting a returning pulse reflected from a surface of an environmental object, and calculating the distance to the reflective object according to the time delay between the emitted pulse and the reception of the reflected pulse, which may be commonly referred to as time of flight (TOF) method. The laser can be rapidly and repeatedly scanned across a scene to provide continuous real-time information on distances to reflective objects in the scene. However, the efficiency and scanning speed of current LiDAR systems may still be improved.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example on-chip or integrated continuous-wave LiDAR system. The example continuous-wave LiDAR system may include one or more on-chip or off-chip laser light sources configured to generate one or more light beams and one or more light engines configured to respectively receive the one or more light beams. The light frequency is modulated in a predefined pattern. Each of the one or more light engines may include a light transmitter, a light receiver, and a balanced detector. The light transmitter may be configured to receive a first portion of one of the light beams and transmit the first portion of the light beam at a predetermined angle. The light receiver may be configured to receive the first portion of the light beam reflected from an object and transmit the reflected first portion of the light beam to the balanced detector. The balanced detector may be configured to detect a beat between the reflected first portion of the light beam with a second portion of the light beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is a block diagram illustrating an example on-chip continuous-wave LiDAR system including multiple light engines that are arranged on a curved edge.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
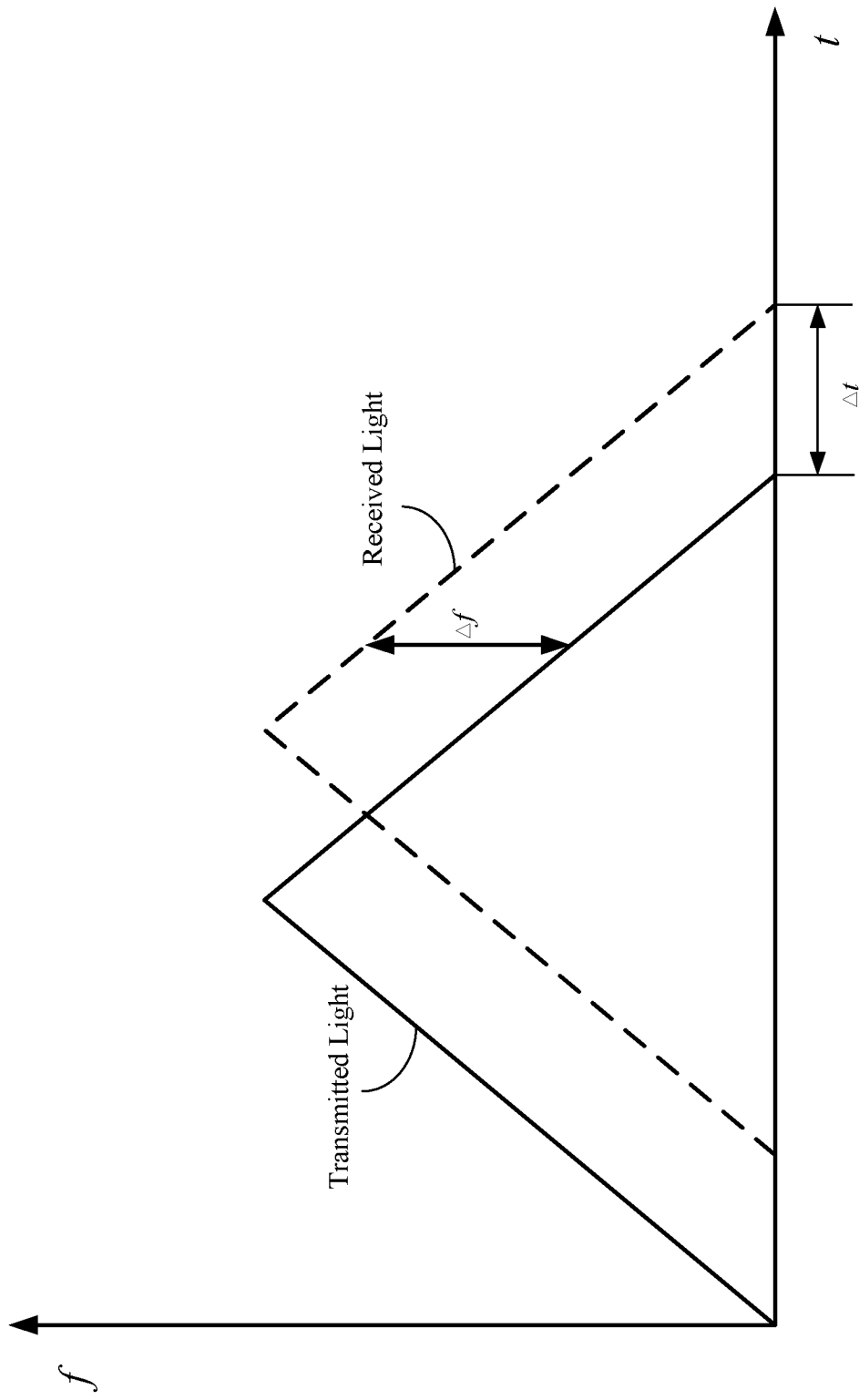
FIG. 1 is a diagram illustrating a relationship between the transmitted laser light beam and the received laser light beam.

FIG. 1 is a diagram illustrating a relationship between the transmitted laser light beam and the received laser light beam.

As depicted, a conventional frequency-modulated continuous-wave LiDAR system may be configured to transmit a light typically from a laser light source. In some examples, the frequency of the emitting light may vary over time such that the light frequency change may be presented as a triangle in a time-frequency graph as FIG. 1. The frequency modulated light may include a first half period in which the frequency of the light increases over time and a second half period in which the frequency of the light decreases over time. The transmitted will be split into two portions. First portion will be emitted and reflected from a surface of an object after a period of time and received by the LiDAR system. The received light frequency change may also be represented as a triangle in the time-frequency graph since reflection will only introduce a delay in time and does not change the frequency of the transmitted light. The LiDAR system may then detect a stable frequency difference between the second portion of transmitted light and the received light. A processor of the LiDAR system may be configured to calculate the distance between the LiDAR system and the surface of the object according to the following formula:

$$d = \frac{\Delta f \cdot c}{\alpha \cdot 2}$$

in which d denotes the distance, $\Delta f$ denotes the frequency difference, c denotes the speed of light, and $\alpha$ denotes a slope of light frequency change over time.

Figure 2:
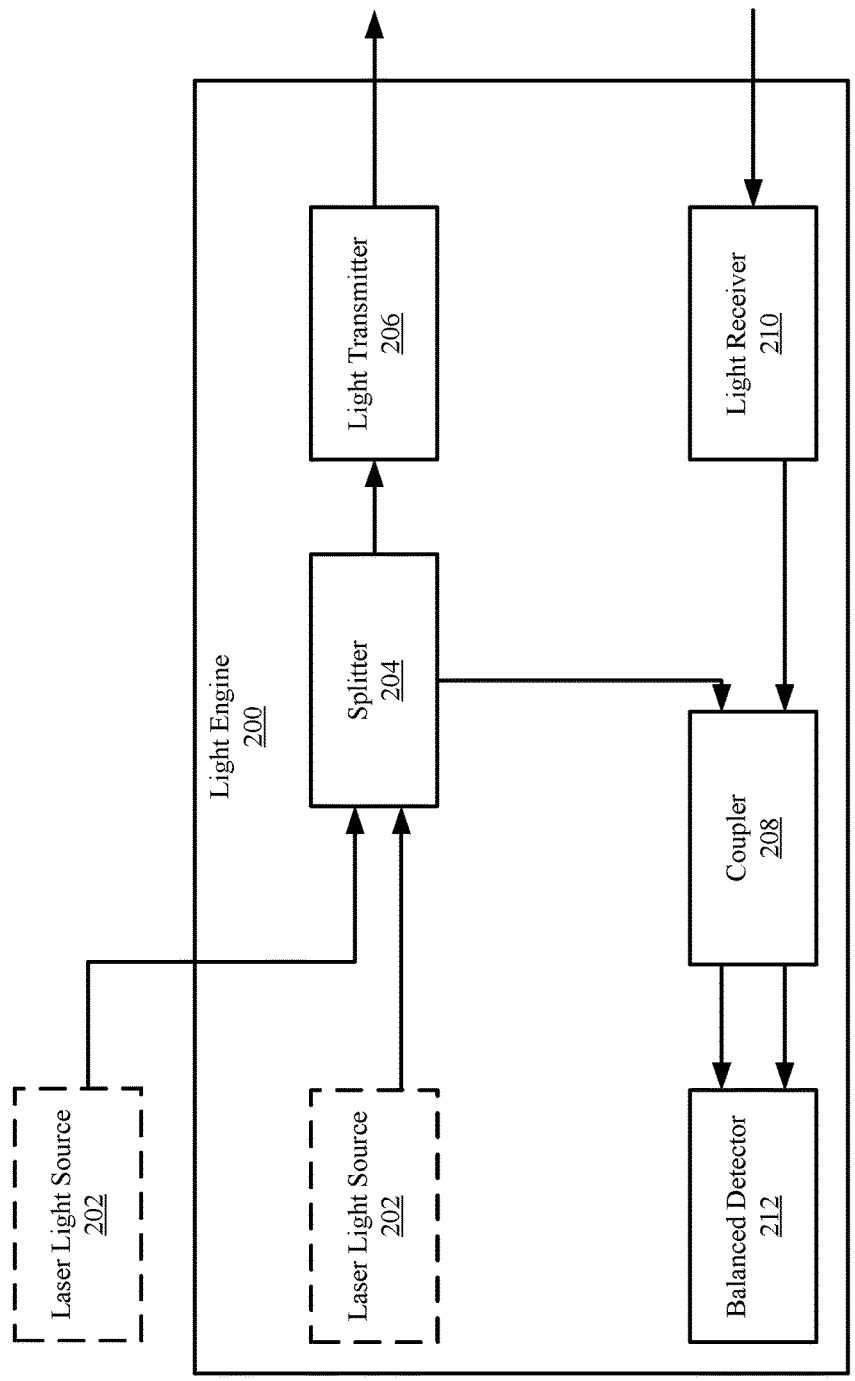
FIG. 2 is a block diagram illustrating an example light engine in the example of an on-chip continuous-wave LiDAR system.

FIG. 2 is a block diagram illustrating an example light engine in the example continuous-wave LiDAR system.

As depicted, the example continuous-wave LiDAR system may include one or more light engines, e.g., light engine 200, configured to generate and receive one or more light beams. In some examples, the light engine 200 may be integrated on a semiconductor chip to reduce the size of the example continuous-wave LiDAR system. The components of the light engine 200 may be implemented in a form of semiconductor modules on the chip. The light engine 200 may include a laser light source 202 or be coupled to an external laser light source. In some examples, the laser light source 202 may be directly modulated by chirped driving. That is, a driving signal that controls the laser light source 202 may be input to the laser light source 202 with a varying intensity over time such that the output light frequency of the laser light source 202 is shaped in the time-frequency graph as the light pulse in FIG. 1. In some other examples, the laser light source 202 may further include a modulator that receives a modulation signal. The modulator may be configured to modulate the light beam based on the modulation signal to produce the output light with frequency change in FIG. 1.

The light engine 200 may further include a splitter 204 configured to receive the light beam output from the laser light source 202 and further split the light beam into a first portion and a second portion. The first portion may be transmitted to a light transmitter 206 and the second portion may be transmitted to a coupler 208. The first portion and the second portion are of the same frequency at any timepoint. Thus, the first portion and the second portion are identical in the time-frequency graph at splitter 204.

The light transmitter 206 may be configured to transmit the first portion of the light beam at a predetermined angle. When the transmitted first portion of the light beam is reflected from a surface of an object, the reflected first portion of the light beam may be received by a light receiver 210. The reflected first portion may be further transmitted to the coupler 208. The second portion of the light beam and the reflected first portion of the light beam may be mixed in the couple 208 and further transmitted to a balanced detector 212.

Figure 2A:
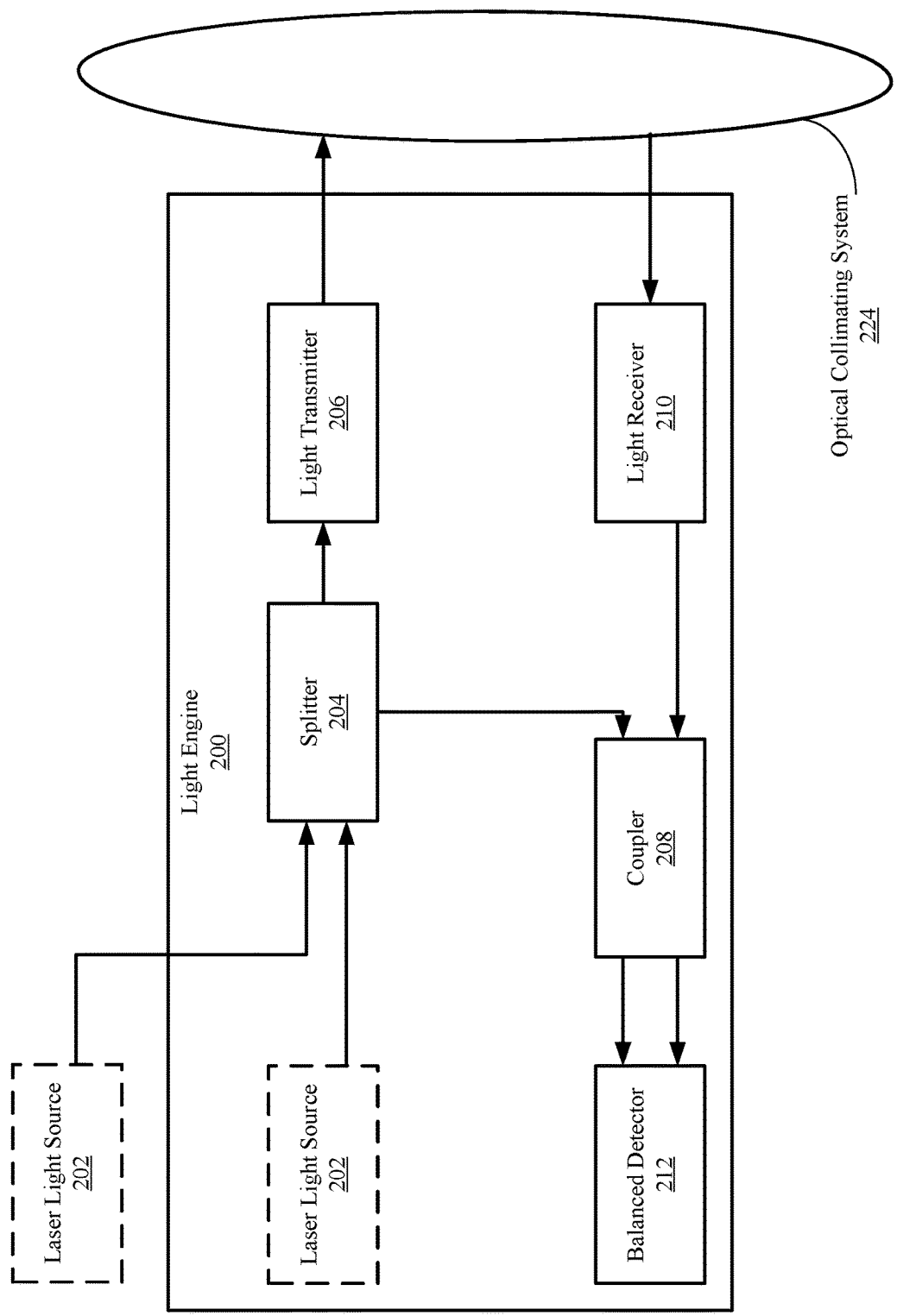
FIG. 2A is a block diagram illustrating the example light engine integrated with an optical collimating system.
Figure 2B:
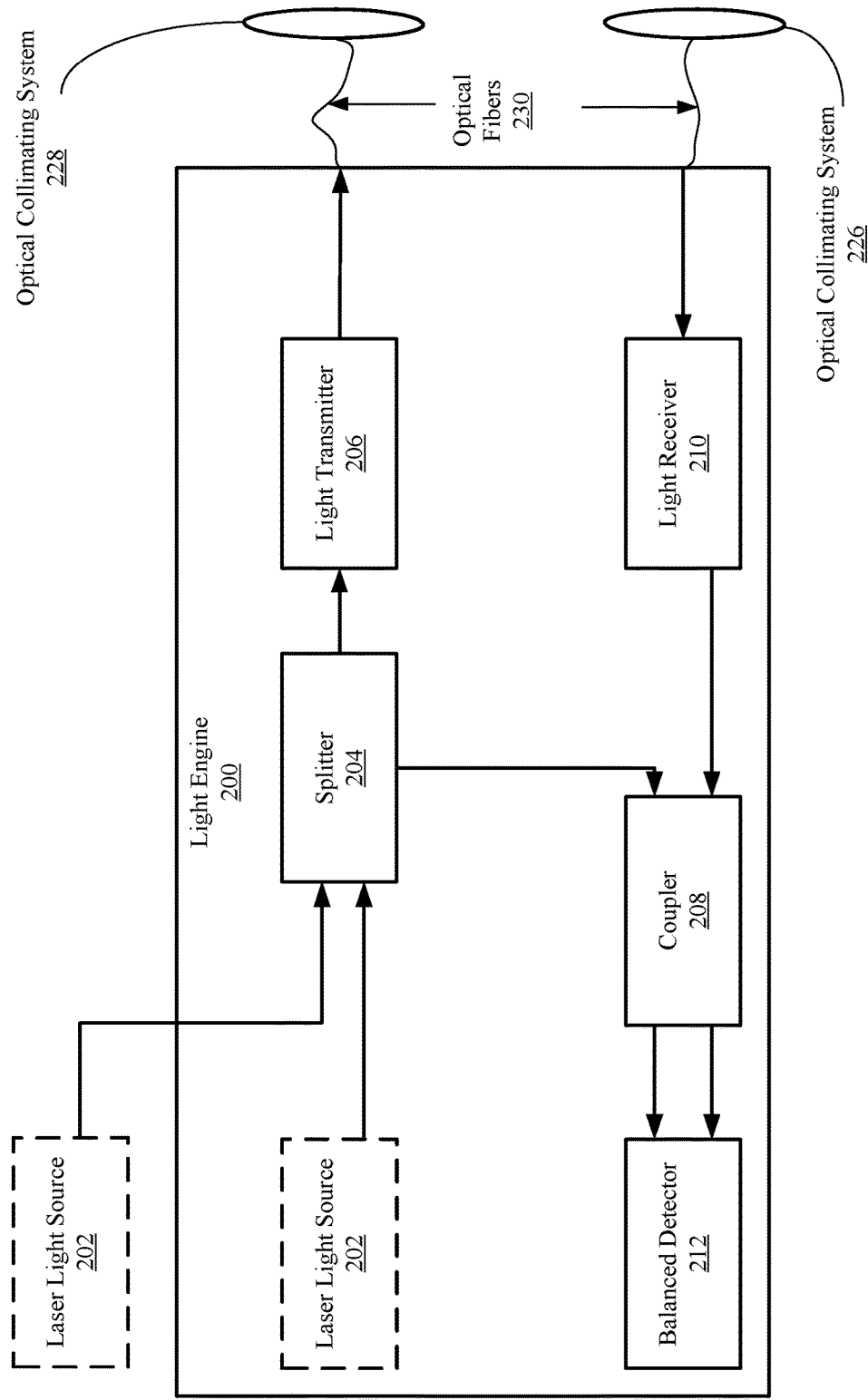
FIG. 2B is a block diagram illustrating the example light engine integrated with two optical collimating systems via optical fibers.
Figure 2C:
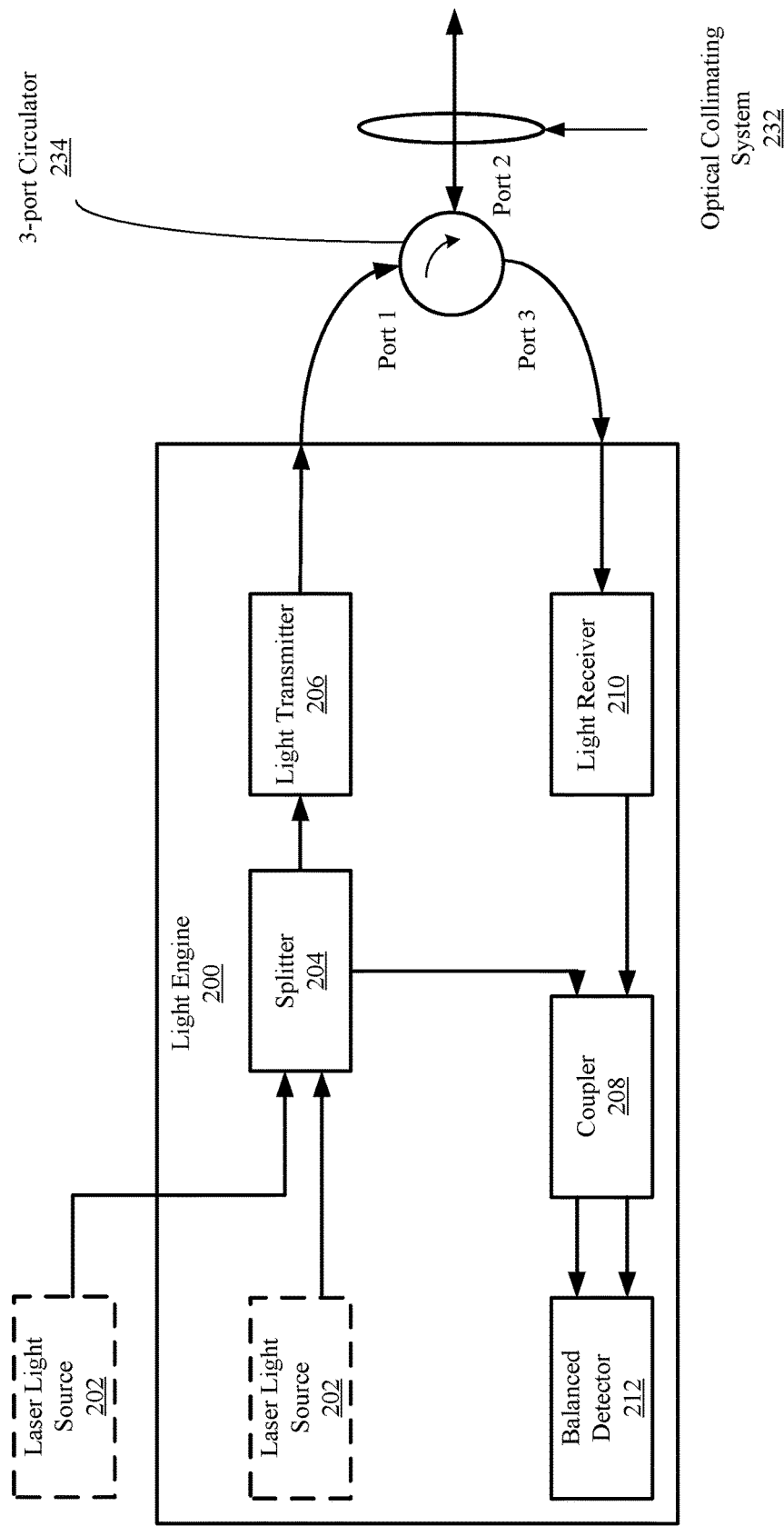
FIG. 2C is a block diagram illustrating the example light engine integrated with a 3-port circulator.
Figure 2D:
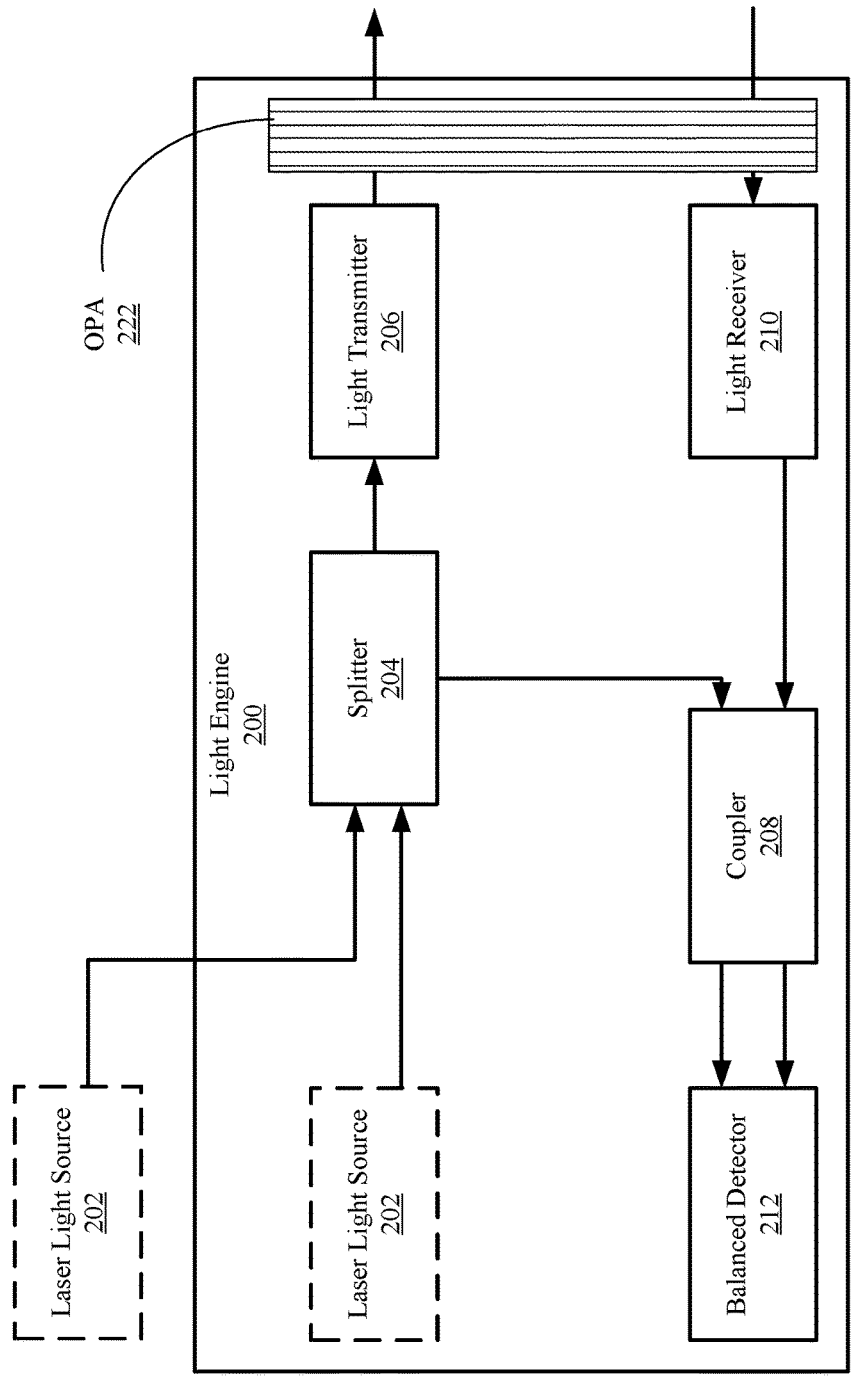
FIG. 2D is a block diagram illustrating the example light engine integrated with an OPA.

As shown in FIGS. 2-2D, the light transmitter 206 and the light receiver 210 may be connected to two different ports of the light engine 200. In the examples illustrated in other figures, the light transmitter 206 and the light receiver 210 may be integrated and share a same port. The ports on a semiconductor chip may refer to on-chip waveguide terminated at chip edge and exposure the facet for light coupling in and out or a mode expansion section.

Returned light and second portion of transmitted light will be mixed in coupler 208 and the mixed signal will be split into two branches and feed into a balanced detector 212.

The balanced detector 212 detect the signal and remove the common noise and DC signals from the two branches. Frequency of the signal detected by 212 is the frequency difference between reflected light and transmitted light and will be used to calculate the distance. Based on the determination of the frequency of the beat signal, a processing unit can further calculate distance between the light engine 200 and the surface of the object in accordance with the aforementioned formula.

FIG. 2A is a block diagram illustrating the example light engine integrated with an optical collimating system. As depicted, the light engine 200 may be coupled to an optical collimating system 224. The optical collimating system 224 may include a convex lens or a multiple lens system that include one or more lenses. The optical collimating system 224 may be configured to collimate the transmitted first portion of the light beam and collect the reflected first portion of the light beam.

FIG. 2B is a block diagram illustrating the example light engine integrated with two optical collimating systems via optical fibers. As shown, the light engine 200 may be coupled to two optical collimating system 226 and 228 via optical fibers 230. The optical collimating system 228 may be configured to collimate the first portion of the light beam transmitted from the light transmitter 206 via the optical fibers 230. The optical collimating system 226 may be configured to collect the reflected first portion of the light beam and couple light into light receiver 210.

FIG. 2C is a block diagram illustrating the example light engine integrated with a 3-port circulator. As depicted, the light engine 200 may be coupled to a 3-port circulator 234. The 3-port circulator 234 may include three ports for receiving and transmitting light, e.g., respectively port 1, port 2, and port 3. In some examples, the light received at port 1 may be transmitted to port 2 and, similarly, the light received from port 2 may be transmitted port 3. The light transmitted to port 2 may be further transmitted to an optical collimating system 232.

FIG. 2D is a block diagram illustrating the example light engine integrated with an optical phase array (OPA). In some examples, an optical phase array (OPA) 222 may be provided to steer the transmitted first portion of the light beam toward a first direction. In at least some examples, the OPA 222 may be integrated on a same photonic chip with the light engine 200. An optical phased array (OPA) may refer to the optical analog of a radio wave phased array. By dynamically controlling the optical properties of a surface on a microscopic scale, it is possible to steer the direction of light. In at least some examples, the OPA 222 may be integrated on a same photonic chip with the light engine 200. Other than the OPA 222 steering the transmitted light beam, replacement steering devices may also be configured to steer the transmitted first portion of the light beam at a direction perpendicular to the first direction. Replacement steering devices may be optical grating, a mirror galvanometer, a polygon mirror, a MEMS mirror or a combination of OPA and above devices.

Figure 3:
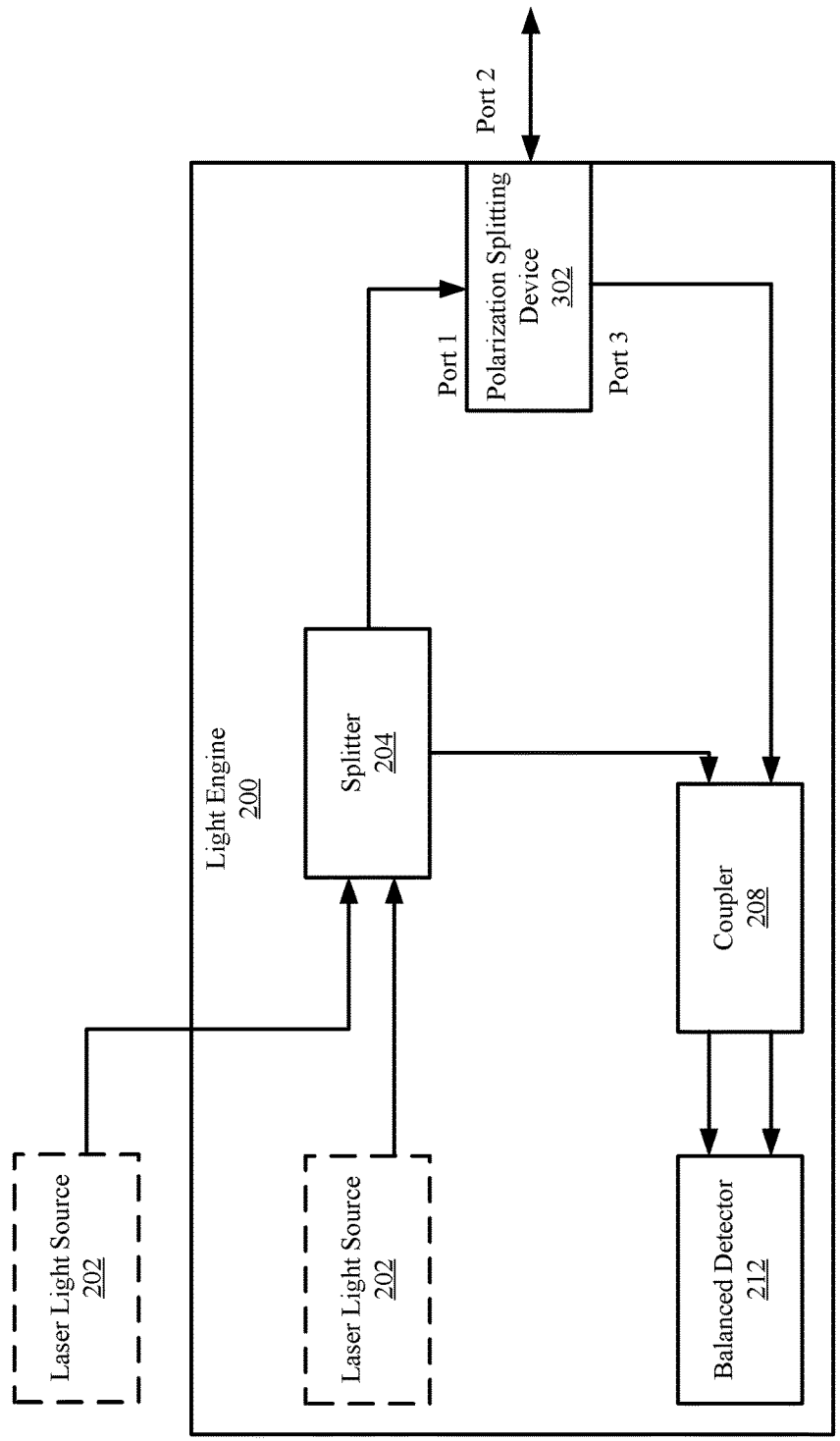
FIG. 3 is a block diagram illustrating another example light engine.

FIG. 3 is a block diagram illustrating another example light engine. As depicted, the light engine 200 may include a polarization splitting device 302 that integrates a light transmitter and a light receiver. The polarization splitting device 302 may include three ports respectively receive and transmit light. The first portion of the light beam may be input to the polarization splitting device 302 at port 1, regardless of its polarization, and output from port 2. The light received at port 2 may be split based on the polarization and respectively transmitted to port 1 and port 3. For example, TE (transverse electric) polarized light received at port 2 may be transmitted to port 1 and TM (transverse magnetic) polarized light received at port 2 may be transmitted to port 3 and further to the coupler 208.

Figure 3A:
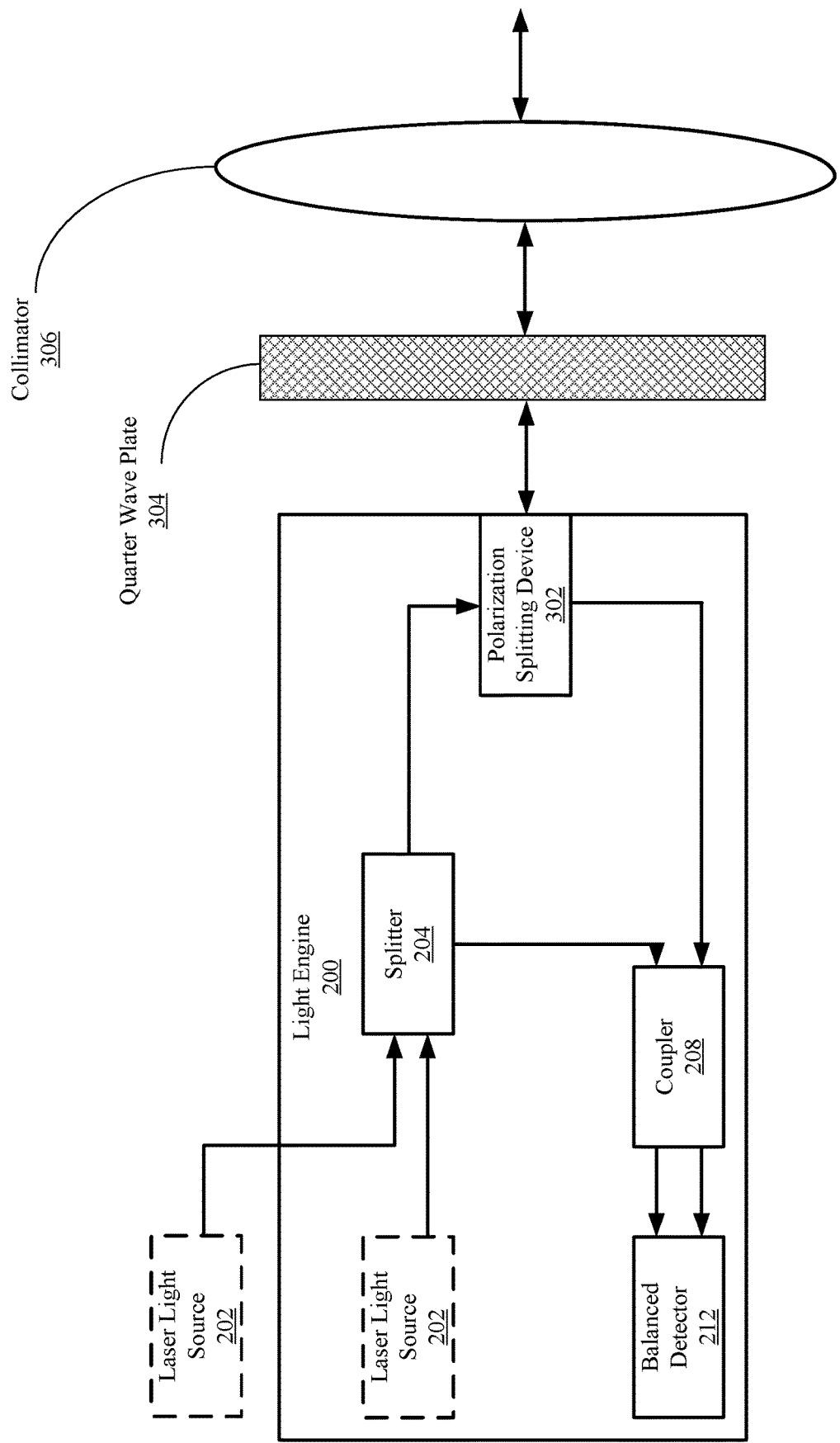
FIG. 3A is a block diagram illustrating the example light engine integrated with a quarter wave plate and collimator.

FIG. 3A is a block diagram illustrating the example light engine coupled to a quarter wave plate. As depicted, the light engine 200 may be integrated with a quarter wave plate 304 and a collimator 306. In some examples, the quarter wave plate 304 may be positioned between the collimator 306 and the light engine 200. In some other examples, the collimator 306 may be placed between the quarter wave plate 304 and the light engine 200.

Figure 3B:
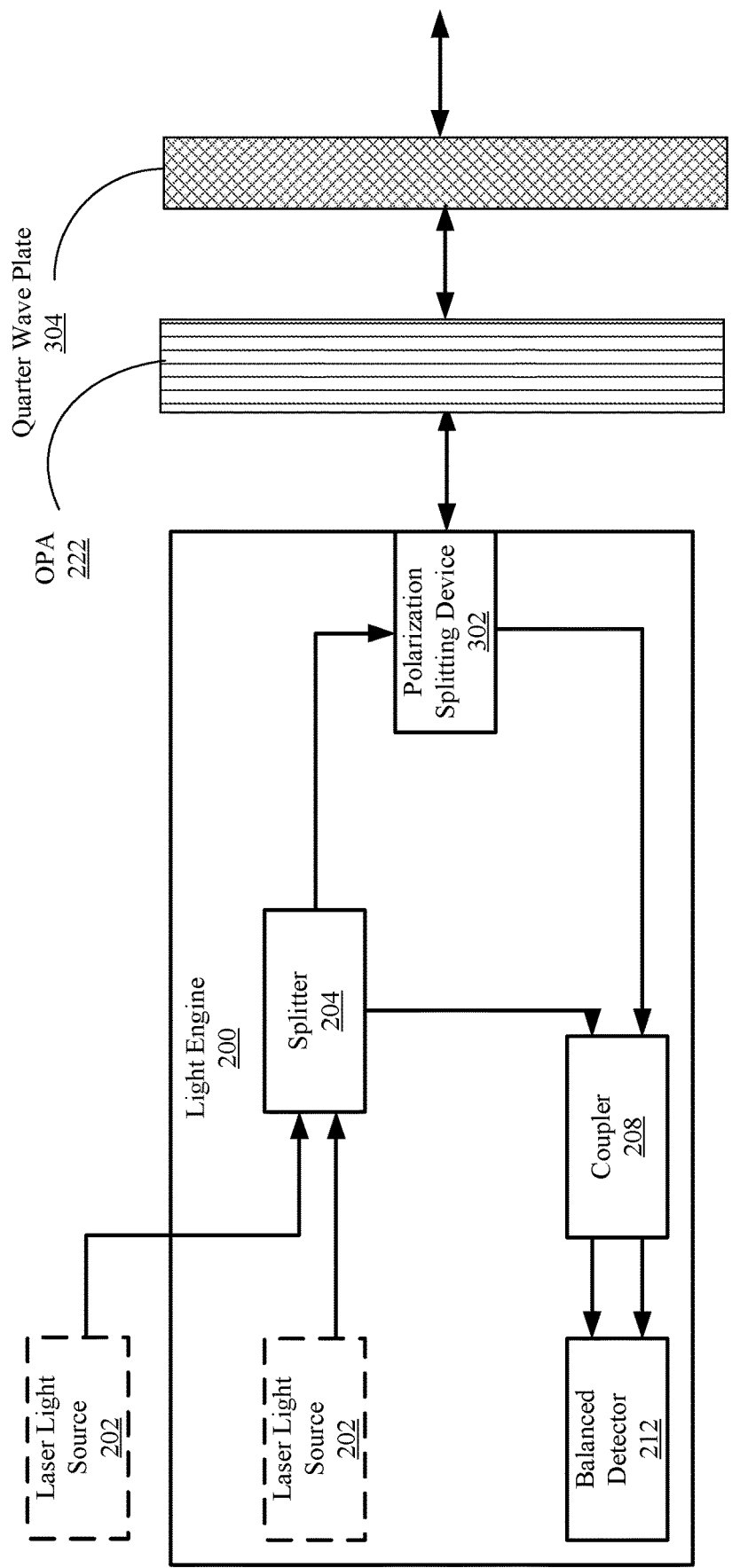
FIG. 3B is a block diagram illustrating the example light engine integrated with an optical phase array and quarter wave plate.

FIG. 3B is a block diagram illustrating the example light engine integrated with an optical phase array. As depicted, the light engine 200 may be coupled to the OPA 222 configured to steer the direction of light. In at least some examples, the OPA 222 may be integrated on a same photonic chip with the light engine 200. In some examples, a quarter wave plate 304 may be further coupled to the OPA 222. Other than the OPA 222 steering the transmitted light beam, replacement steering devices may also be configured to steer the transmitted first portion of the light beam at a direction perpendicular to the first direction. Replacement steering devices may be optical grating, a mirror galvanometer, a polygon mirror, a MEMS mirror or a combination of OPA and above devices.

Figure 4:
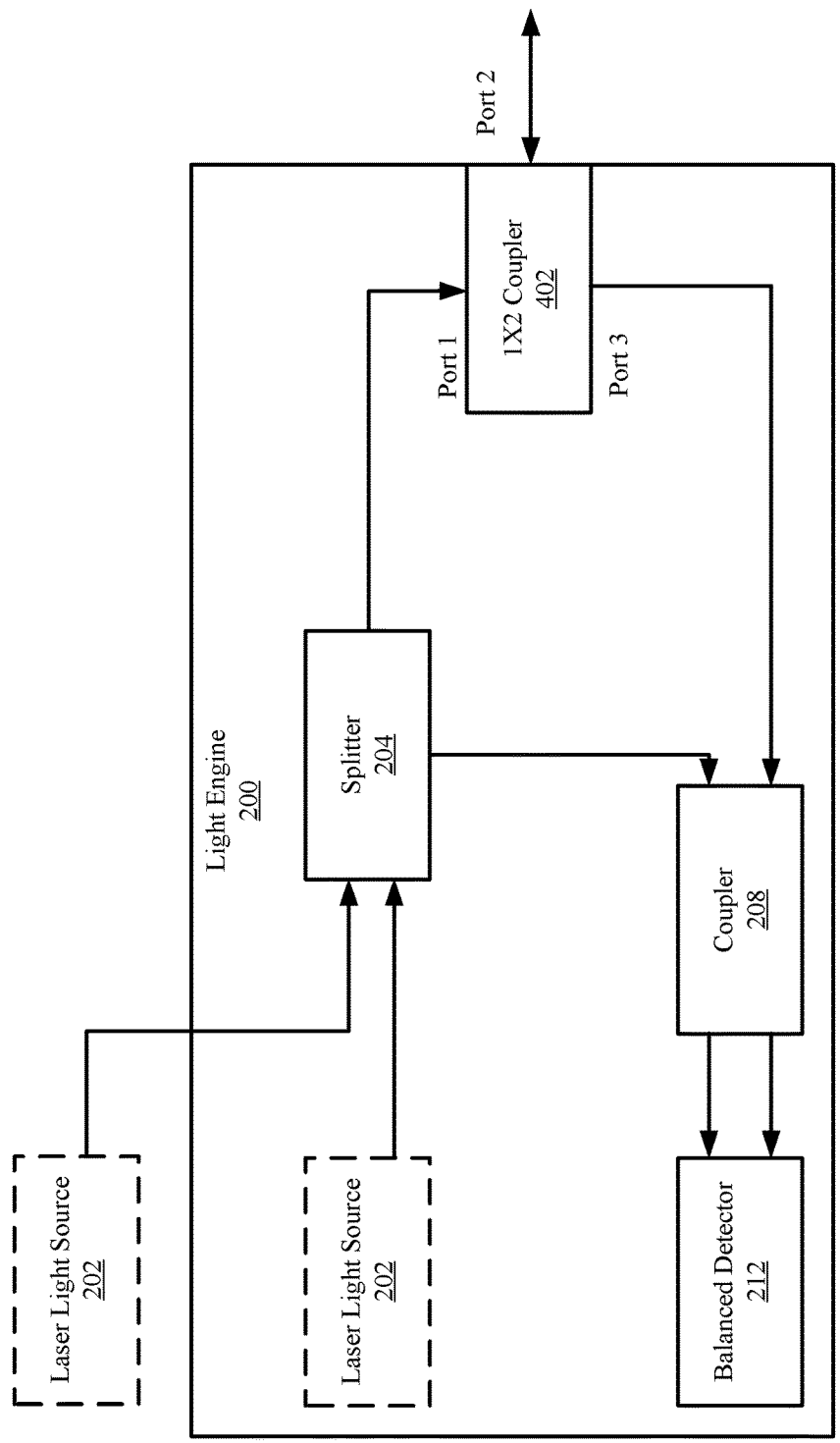
FIG. 4 is a block diagram illustrating another example light engine.

FIG. 4 is a block diagram illustrating another example light engine. As depicted, the light engine 200 may include an 1×2 coupler 402 configured to receive the first portion of the light beam from the splitter 204 and output the first portion of the light beam. The 1×2 coupler 402 is further configured to receive the reflected first portion of the light beam and transmit the reflected first portion of the light beam to the coupler 208.

The 1×2 coupler 402 may refer to a 3-port optical component integrated on the same semiconductor chip as the light engine 200 or external to the light engine 200. In some examples, the light input into port 1 may be transmitted to port 2 with 50% of the light lost. Similarly, the light transmitted into port 3 may be transmitted to port 2 with 50% of the light lost. The light received at port 2 may be split evenly to port 1 and port 2. That is, 50% of the light received at port 2 may be transmitted to port 1 and the other 50% of the light may be transmitted port 3.

Figure 4A:
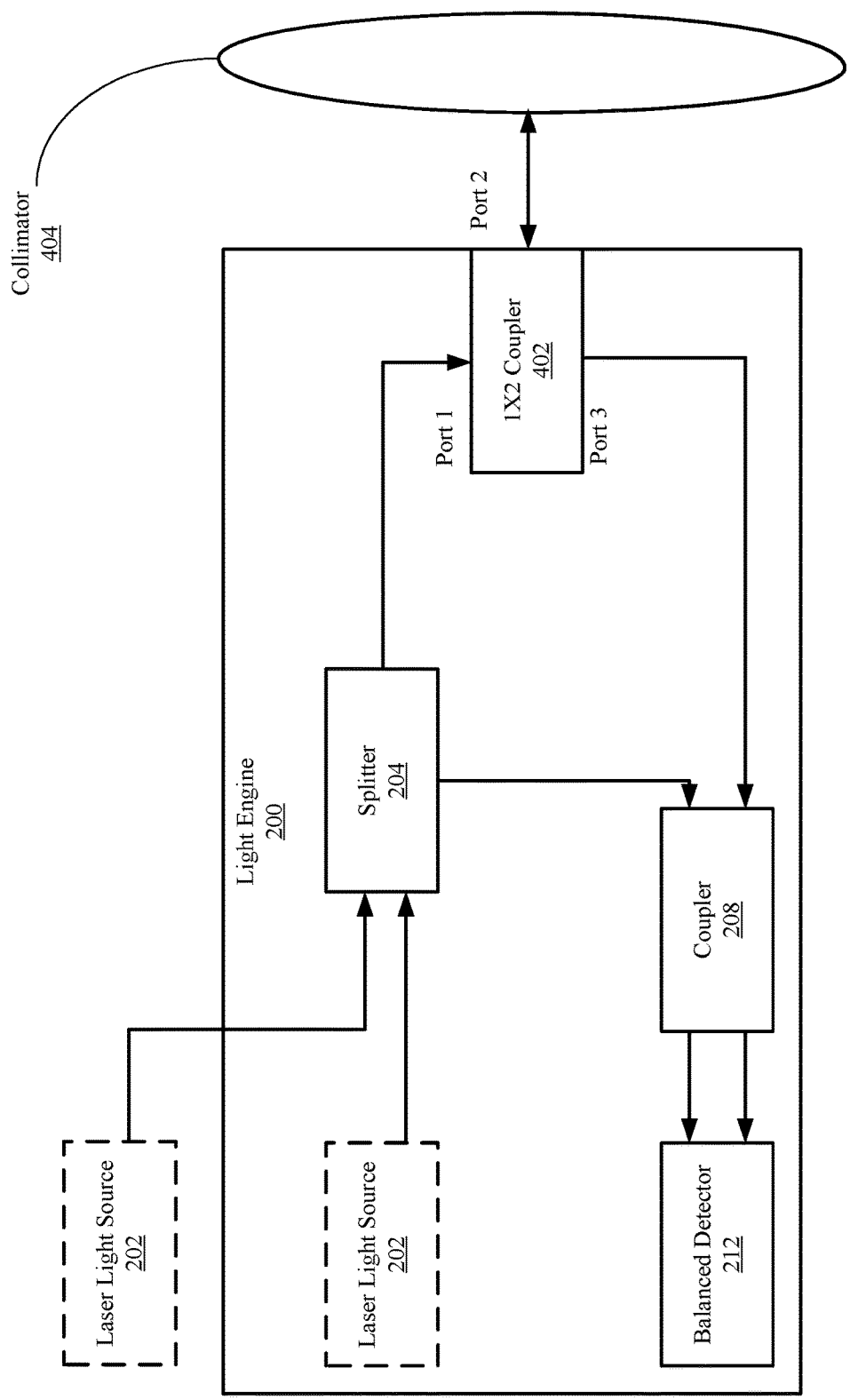
FIG. 4A is a block diagram illustrating the example light engine integrated with a collimator.

FIG. 4A is a block diagram illustrating the example light engine coupled to a collimator. As depicted, the light engine 200 that includes the 1×2 coupler 402 may be coupled to a collimator 404. The collimator 404 may be configured to collimate the light transmitted from port 2 and collect the returned light.

Figure 4B:
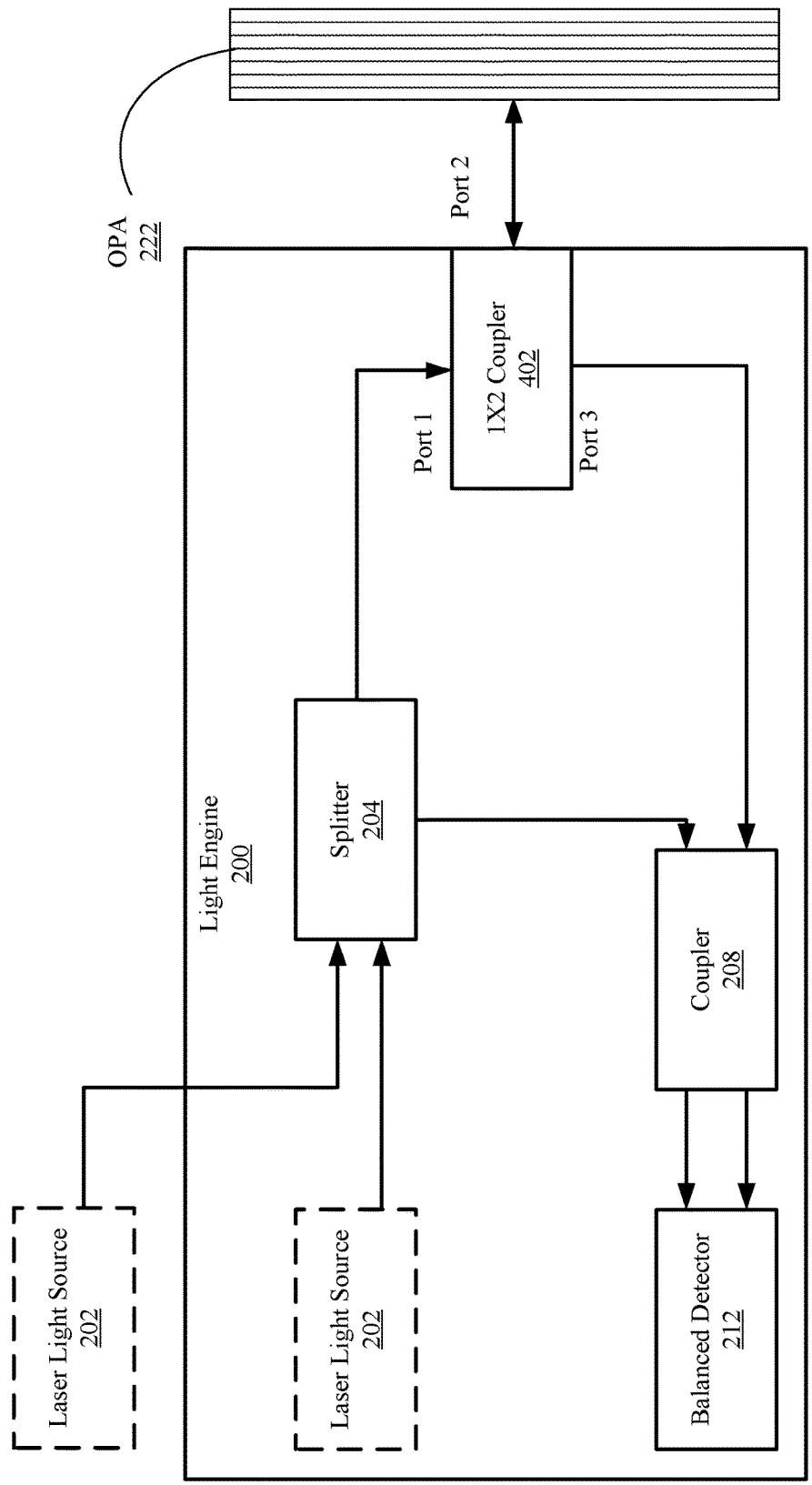
FIG. 4B is a block diagram illustrating the example light engine integrated with an optical phase array.

FIG. 4B is a block diagram illustrating the example light engine coupled to an optical phase array. As depicted, the light engine 200 that includes the 1×2 coupler 402 may be coupled to the OPA 222 configured to steer the light emitted from port 2. In at least some examples, the OPA 222 may be integrated on a same photonic chip with the light engine 200. Other than the OPA 222 steering the transmitted light beam, replacement steering devices may also be configured to steer the transmitted first portion of the light beam at a direction perpendicular to the first direction. Replacement steering devices may be optical grating, a mirror galvanometer, a polygon mirror, a MEMS mirror or a combination of OPA and above devices.

Figure 5:
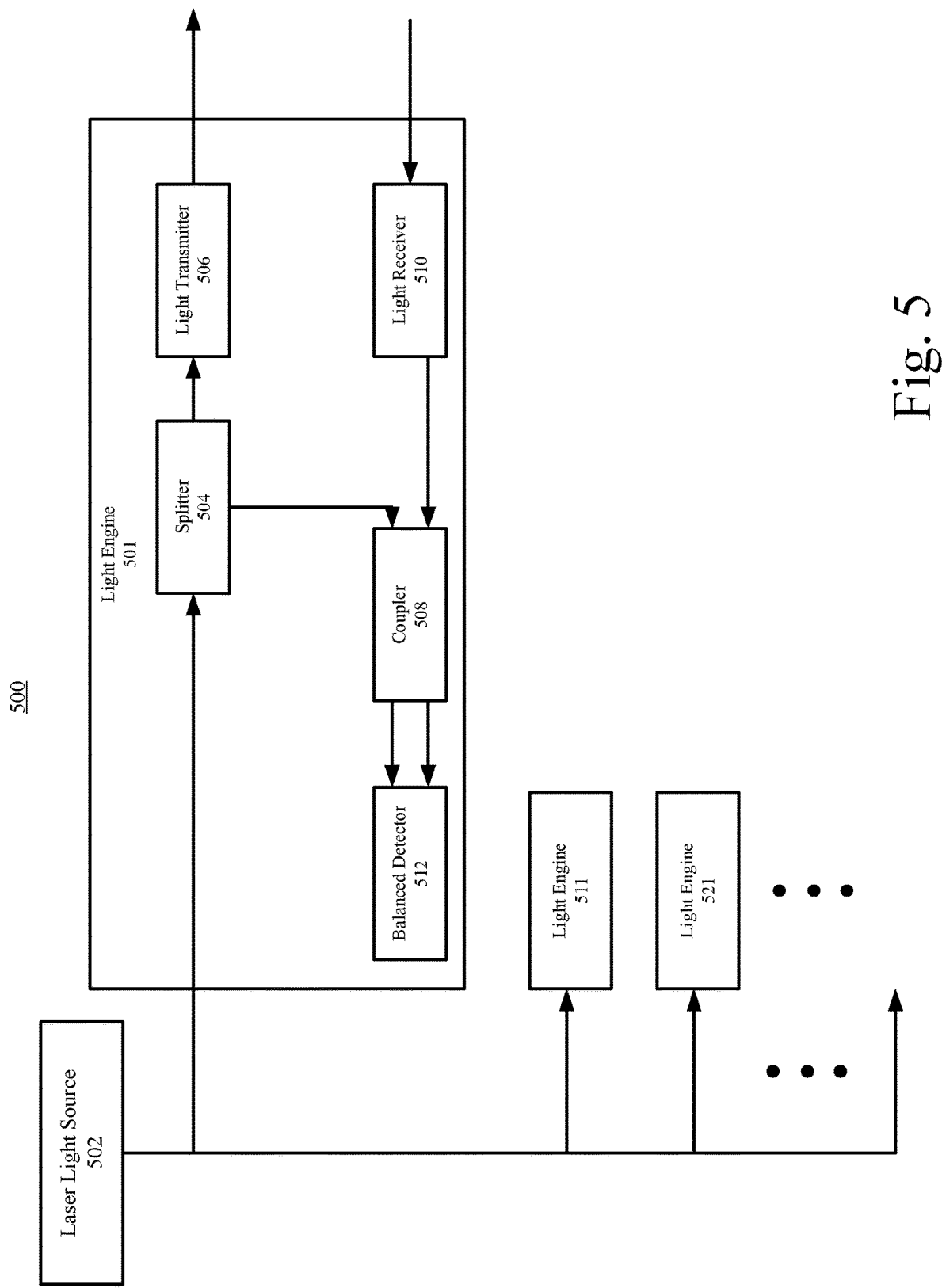
FIG. 5 is a block diagram illustrating an example on-chip continuous-wave LiDAR system that include multiple light engines.

FIG. 5 is a block diagram illustrating an example on-chip continuous-wave LiDAR system 500 that include multiple light engines.

As depicted, the example continuous-wave LiDAR system 500 may include multiple light engines (and this light engine can use architecture described in FIGS. 2-4B), e.g., light engines 501, 511, 521, etc. Again, system 500 can be combined with many other steering systems included OPA to form a complete lidar system. The example continuous-wave LiDAR system, although including multiple light engines, may also be integrated on a single semiconductor chip such that the size of the entire system may be minimized. It is notable that although the light engine 501 includes a light transmitter and a light receiver 510 utilizing different ports on the chip, other light engines may include light receivers and light transmitter integrated in a same port.

In some examples not shown, each of the light engines may include a laser light source. In some other examples, an external laser light source 502 may be configured to provide multiple light beams respectively to each light engine. Each light engine illustrated here may include similar components to those in light engine 200, for example, a splitter 504, a light transmitter 506, a coupler 508, a light receiver 510, a balanced detector 512.

Each light engine may be independently operated. For example, each light engine may be configured to transmit light at a predetermined angle such that the entire system may detect distances between the system and multiple points at the same time, and thus, increase the efficiency and performance (e.g., resolution, etc.) of the example continuous-wave LiDAR system in general.

Figure 6:
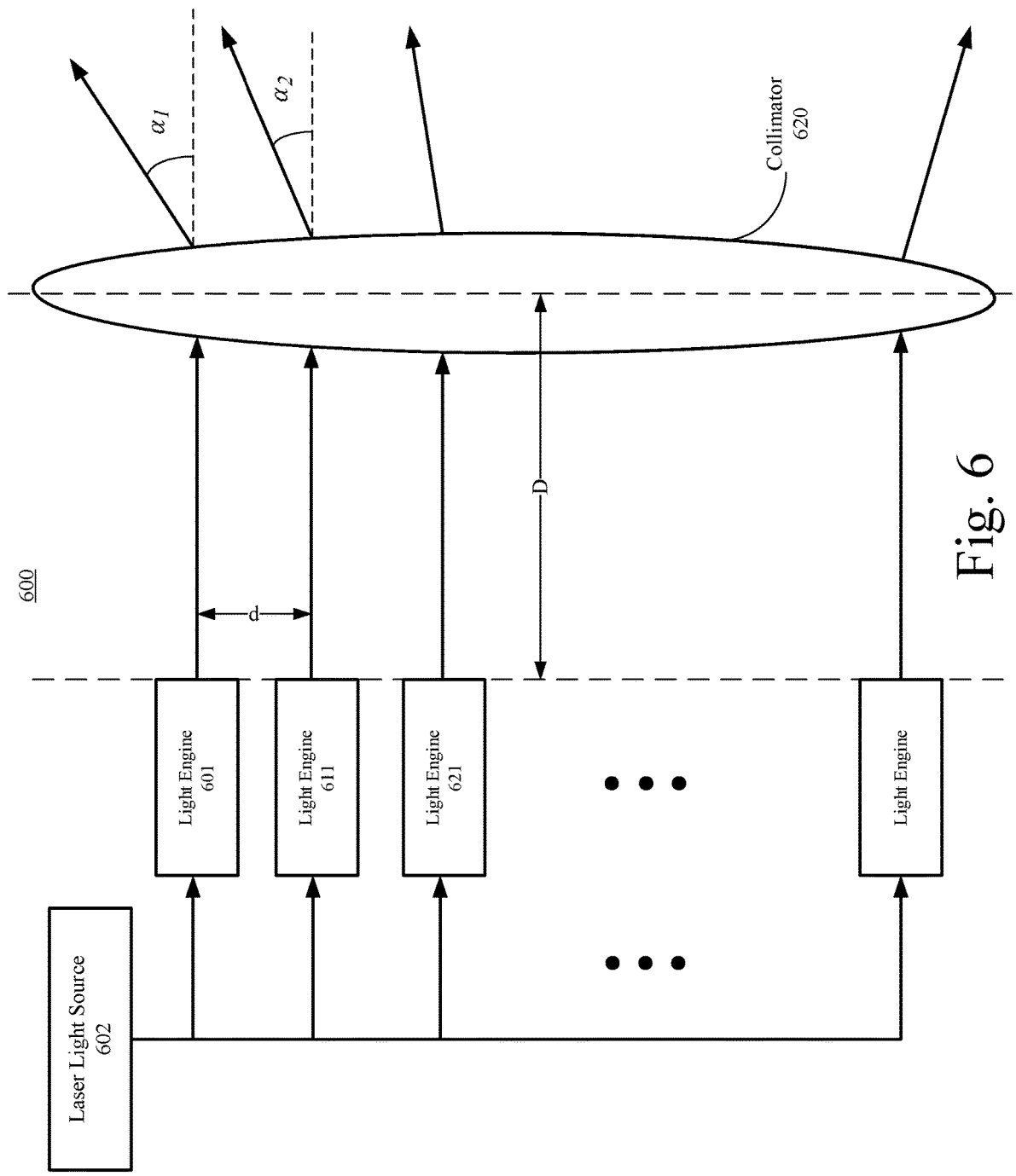
FIG. 6 is a block diagram illustrating an example on-chip continuous-wave LiDAR system including multiple light engines that are arranged on a plane.

FIG. 6 is a block diagram illustrating an example on-chip continuous-wave LiDAR system 600 including multiple light engines that are arranged on a plane.

As depicted, the example continuous-wave LiDAR system 600 may include multiple light engines 601, 611, 621, etc. Each of multiple light engines may be configured to perform similar operations to the light engines 200, 501, 511, 521, etc. and include similar components. Similarly, the multiple light engines 601, 611, 621, etc. may also be integrated on a single semiconductor chip. In some examples, the light engines 601, 611, 621, etc. may be arranged in a plane chip edge. The respective light pulses output from the light engines may pass a collimator and travel toward a preset angle.

As shown, the distance between two light engines may be denoted as d, the angle separation in space may be denoted as $\Delta\alpha$ and may be determined by the difference between the preset angle of each light engine, e.g., α1-α2. The purpose of Δα is to set each light engine to shoot toward and detect different directions so that the light engine array as a whole will cover all the directions (i.e. angles) of interest in the space. In order to achieve this, the chip edge needs to be placed right at the focal plane of the collimator lens, which is certain distance away from the collimator lens. In the example where the light engines are arranged at the distance from the collimator 620 and positioned from each other, the emitting light from the light engines may be directed by the collimator 620 at different directions to cover a space of interest.

FIG. 7 is a block diagram illustrating an example on-chip continuous-wave LiDAR system 700 including multiple light engines that are arranged on a curved surface.

As depicted, the example continuous-wave LiDAR system 700 may include multiple light engines 701, 711, 721, etc. Each of multiple light engines may be configured to perform similar operations to the light engines 200, 501, 511, 521, etc. and include similar components. Similarly, the multiple light engines 701, 711, 721, etc. may also be integrated on a single semiconductor chip.

Since it may be optimal to place the light receivers of the light engines at respective focal spots to achieve best coupling, the multiple light engines 701, 711, 721, etc. may be arranged on a curved chip edge. The curvature of the curved chip edge may be determined based on a front curvature of the collimator 720, a back curvature of the collimator 720, and a refractive index of the collimator 720. In some non-limiting examples where one or more collimators (or collimator lens) are integrated, the curvature may be determined based on the following formula:

$$\text{curvature} = \sum_i \frac{n_{i+1} - n_i}{r_i n_{i+1} n_i}$$

in which $r_i$ denotes the radius of the i-th surface of one of the one or more collimators and $n_{i+1}$ and $n_i$ respectively denote the indices of reflection of the first and the second side of the surface of the collimator 720, and i starts from the outer most surface of the collimators.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A continuous-wave Light Detection and Ranging (LiDAR) system, comprising:
   one or more laser light sources configured to generate one or more light beams, wherein light frequency of the light beams is modulated in a predefined pattern; and
   one or more light engines configured to respectively receive the one or more light beams, wherein the one or more light engines are integrated on a semiconductor chip, and each of the one or more light engines includes:
   a splitter that splits a light beam of the one or more light beams into a first portion and a second portion, and
   a polarization splitting device, wherein the polarization splitting device includes a first port, a second port, and a third port, and the polarization splitting device is configured to:
      receive the first portion of the light beam from a splitter via the first port of the polarization splitting device,
      transmit the first portion of the light beam at a predetermined angle via the second port of the polarization splitting device;
      receive the first portion of the light beam reflected from an object via the second port of the polarization splitting device, and
      transmit a predetermined polarization part of the reflected first portion of the light beam to a balanced detector via the third port of the polarization splitting device, wherein the balanced detector is configured to detect a beat between the predetermined polarization part of the reflected first portion of the light beam with a second portion of the light beam.

2. The continuous-wave LiDAR system of claim 1, further comprising: a distance processor configured to calculate a distance based on a frequency difference between the predetermined polarization part of the reflected first portion of the light beam and the second portion of the light beam.

3. The continuous-wave LiDAR system of claim 1, wherein the one or more light engines are arranged on a curvature of a curved chip edge.

4. The continuous-wave LiDAR system of claim 3, wherein the curvature of the curved chip edge is determined based on a front curvature of a collimator, a back curvature of the collimator, and a refractive index of the collimator.

5. The continuous-wave LiDAR system of claim 4, further comprising a supplemental steering device configured to steer the transmitted first portion of the light beam at different directions in space.

6. The continuous-wave LiDAR system of claim 5, wherein the supplemental steering device includes a device selected from a group consisting of optical phase array, optical grating, a mirror galvanometer, a MEMS mirror, a polygon mirror or combination of these devices.

7. The continuous-wave LiDAR system of claim 1, further comprising: a quarter-wave plate configured to convert the first portion of the light beam into a circularly polarized light beam and convert the reflected first portion of the light beam into linear polarization perpendicular to the first portion of the light beam and coupled into the polarization splitting device.

8. The continuous-wave LiDAR system of claim 1, wherein the continuous-wave LiDAR system is integrated with beam steering devices configured to steer the transmitted first portion of the light beam at different directions, and receive the reflected first portion of the light beam.

9. The continuous-wave LiDAR system of claim 8, wherein the beam steering devices includes a device selected from a group consisting of an optical phase array, an optical grating, a mirror galvanometer, a polygon mirror, and a MEMS mirror.

10. A continuous-wave Light Detection and Ranging (LiDAR) system, comprising:

one or more laser light sources configured to generate one or more light beams, wherein light frequency of the light beams is modulated in a predefined pattern; and
one or more light engines configured to respectively receive the one or more light beams, wherein the one or more light engines are integrated on a semiconductor chip, and each of the one or more light engines includes:
a splitter that splits a light beam of the one or more light beams into a first portion and a second portion, and
a 1×2 coupler that includes a first port, a second port, and a third port, and the 1×2 coupler is configured to:
receive the first portion of the light beam from a splitter via the first port of the 1×2 coupler,
transmit the first portion of the light beam at a predetermined angle via the second port of the 1×2 coupler,
receive the first portion of the light beam reflected from an object via the second port of the 1×2 coupler, and
transmit a predetermined polarization part of the reflected first portion of the light beam to a balanced detector via the third port of the 1×2 coupler, wherein the balanced detector is configured to detect a beat between the predetermined polarization part of the reflected first portion of the light beam with a second portion of the light beam.

* * * * *